US00RE36093E

United States Patent [19]

Wyman et al.

[11] E Patent Number: Re. 36,093

[45] Reissued Date of Patent: Feb. 16, 1999

[54] SUBMERSIBLE BOAT

[75] Inventors: David B. Wyman, Panama City; JoAnn Davis, Parker, both of Fla.

[73] Assignee: The United States of America as represented by the Secretary of the Navy, Washington, D.C.

[21] Appl. No.: 777,725

[22] Filed: Dec. 20, 1996

Related U.S. Patent Documents

Reissue of:

[64] Patent No.: 5,377,613
Issued: Jan. 3, 1995
Appl. No.: 83,232
Filed: Jun. 29, 1993

[51] Int. Cl.[6] ..... B63G 8/18; B63G 8/08

[52] U.S. Cl. ..... 114/332; 114/271; 114/333; 114/338

[58] Field of Search ..... 114/163, 312, 114/271, 313, 330, 331, 332, 333, 338, 337, 357

[56] References Cited

U.S. PATENT DOCUMENTS

| | | | |
|---|---|---|---|
| 1,436,902 | 11/1922 | Perley | 114/21.1 |
| 1,780,767 | 11/1930 | Scott-Paine | 114/163 |
| 2,143,656 | 1/1939 | Hojnowski | 114/338 |
| 2,377,442 | 6/1945 | Osterhoudt | 114/338 |
| 2,627,832 | 2/1953 | Gagliano | 114/70 |
| 2,849,978 | 9/1958 | Durham | 114/338 |
| 2,929,346 | 3/1960 | Perce | 114/331 |
| 3,134,351 | 5/1964 | Ely, Jr. | 114/332 |
| 3,460,504 | 8/1969 | Boyce, II | 114/313 |
| 3,463,108 | 8/1969 | Neumeier | 114/313 |
| 3,598,074 | 8/1971 | Schubert | 114/338 |
| 3,677,212 | 7/1972 | Gregoire | 114/61 |
| 3,811,141 | 5/1974 | Stoeberl | 114/357 |
| 4,561,370 | 12/1985 | Sanford | 114/163 |
| 4,763,596 | 8/1988 | Yoshida | 114/256 |
| 5,373,800 | 12/1994 | Steinberg | 114/282 |

FOREIGN PATENT DOCUMENTS

| | | | |
|---|---|---|---|
| 116554 | 6/1918 | United Kingdom | 114/339 |
| 2 006 127 | 5/1979 | United Kingdom | 114/313 |

OTHER PUBLICATIONS

A. Murray, "The Hydrodynamics of Planing Hulls", SNAME, 658–692, 1950.

J. Sweeney, "A Pictorial History of Oceanographic Submersibles", 276–300, 1970.

R. Busby, "Manned Submersibles", 104–105, 1976.

J. Alden, The Fleet Submarine in the U.S. Navy, 168–172, 1979.

"Tech Update", Popular Mechanics, 17, Sep. 1990.

*Primary Examiner*—Sherman Basinger

*Attorney, Agent, or Firm*—Harvey A. Gilbert; Kenneth W. Dobyns

[57] ABSTRACT

A submersible boat is provided which utilizes a planing boat hull with a sharp bow and blunt stern. The submersible boat performs as a planing boat until it nears the target location. Then, the boat submerges in order to avoid detection. After this vessel submerges, it travels with the blunt end forward and the sharp end aft.

13 Claims, 4 Drawing Sheets

SUBMERSIBLE BOAT

Matter enclosed in heavy brackets [ ] appears in the original patent but forms no part of this reissue specification; matter printed in italics indicates the additions made by reissue.

FIELD OF THE INVENTION

This invention provides a vessel capable of switching from operating as a planing boat when the pointed end of the vessel is forward to operating as a submersible boat when the blunt end of the vessel is forward.

BACKGROUND OF THE INVENTION

Military operations frequently require that military personnel approach from the sea and reach the shore quickly, quietly, and in good physical condition. Submersible vessels can be used to deliver personnel to the shore. However, a long trip in a submerged vessel will degrade the physical condition of the persons within such a vessel, and thus make complex missions more difficult. Planing boats can be used, but they make too much noise for a military operation. Another possible approach is to tow a submersible vessel close to the launch site with a planing sled. However, use of a sled requires the use of a powerful high speed surface craft as a towing vessel. The use of a high speed surface craft complicates the operation and precludes air deployment.

SUMMARY OF THE INVENTION

This submersible boat is designed to deliver military personnel to a target location. The submersible boat is lowered into the water and lifted out of the water either by crane or helicopter.

This vessel utilizes a planing boat hull with a sharp bow and blunt stern. The submersible boat has a foam core top which is constructed of a glass fiber material consisting of fine glass fibers woven into a cloth and combined with resin, such as is sold under the trademark "FIBERGLASS". The hull shape and low center of gravity make the submersible boat stable as it operates as a planing boat. Two 250 horsepower outboard motors provide surface propulsion. These motors are modified to allow them to be submerged, brought back to the surface, drained of water, and re-stared. The submersible boat performs as a planing boat until it nears the target location.

When the submersible boat nears the target location, the vessel is submerged in order to avoid detection. The submersible boat submerges through movement of bow planes and stern planes, and the movement of water into ballast tanks. To submerge, the open ballast tanks located beneath the deck of the vessel are fully vented. Final neutral buoyancy and trim is achieved by pumping water into the closed ballast tanks, which are welded onto the deck of the hull.

After this vessel submerges, it travels with the blunt end forward and the sharp end aft. Underwater propulsion is provided by propellers.

This boat operates efficiently because it moves with the sharp end forward when planing, and the blunt end forward when submerged. A planing boat must be sharply pointed at the bow to travel across the surface at high speeds, particularly when there are large waves. A planing boat must have a blunt stern so that the water can break loose from the hull. A submerged boat should be blunt on the forward end and gradually tapered to a point at the aft end to keep the water from separating from the hull and greatly increasing the resistance.

After completion of operations, the submersible boat ascends through movement of bow planes and stern planes, and the movement of water out of the ballast tanks. Water is blown out of the open ballast tanks, and drains out of the closed ballast tanks.

BRIEF DESCRIPTION OF THE DRAWINGS

The invention will be best understood by referring to the accompanying drawings, wherein.

DETAILED DESCRIPTION

Figure 1:
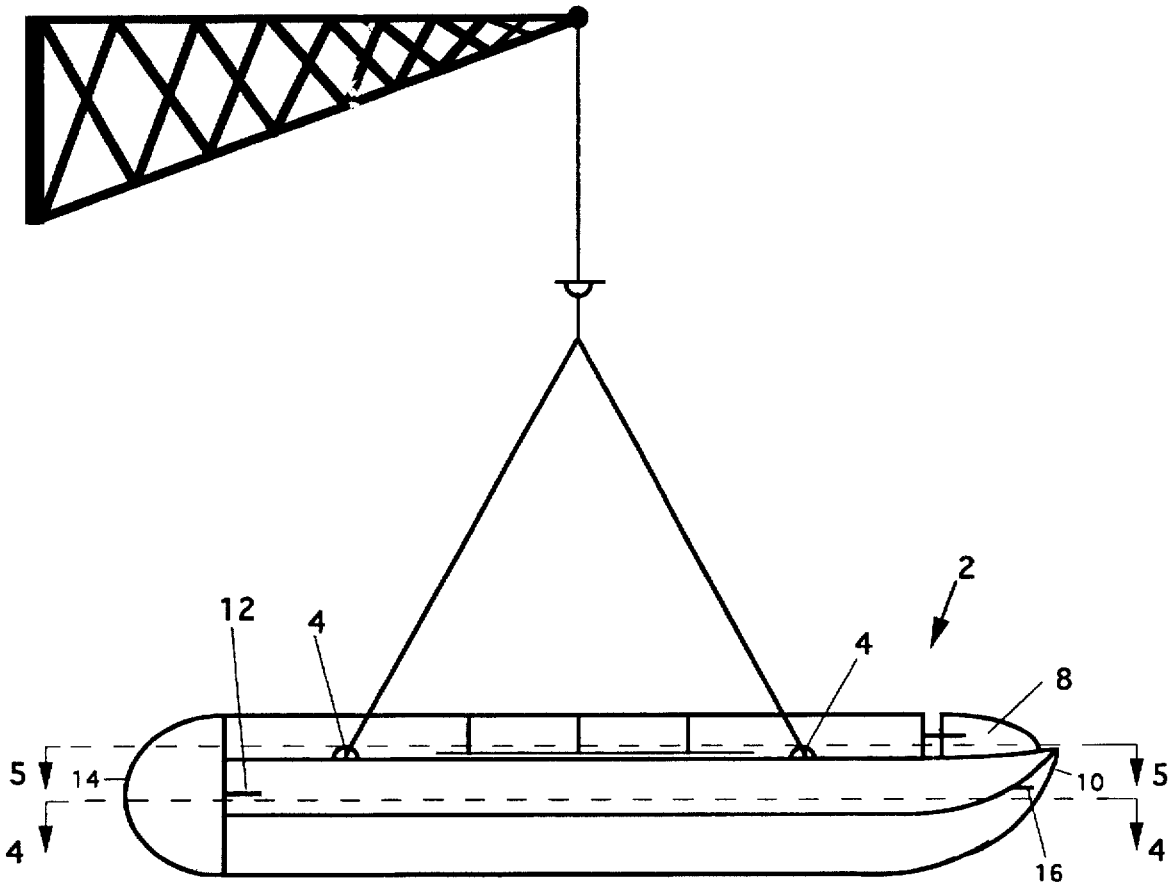
FIG. 1 is a side view of the submersible boat as it is lowered into the water by a crane.

FIG. 1 illustrates the submersible boat 2 as it is lowered into the water. Lifting eyes 4 allow for hoisting of the submersible boat 2 by a crane. A lift sling 6 is shackled to the lifting eyes 4. The crane supports the lift sling 6. The rudder 8 is located at the top of the submersible boat 2 near the pointed end 10. Bow planes 12 are located along the sides of the submersible boat 2 near the blunt end 14. Stern planes 16 are located along the sides of the submersible boat 2 near the pointed end 10.

Figure 2:
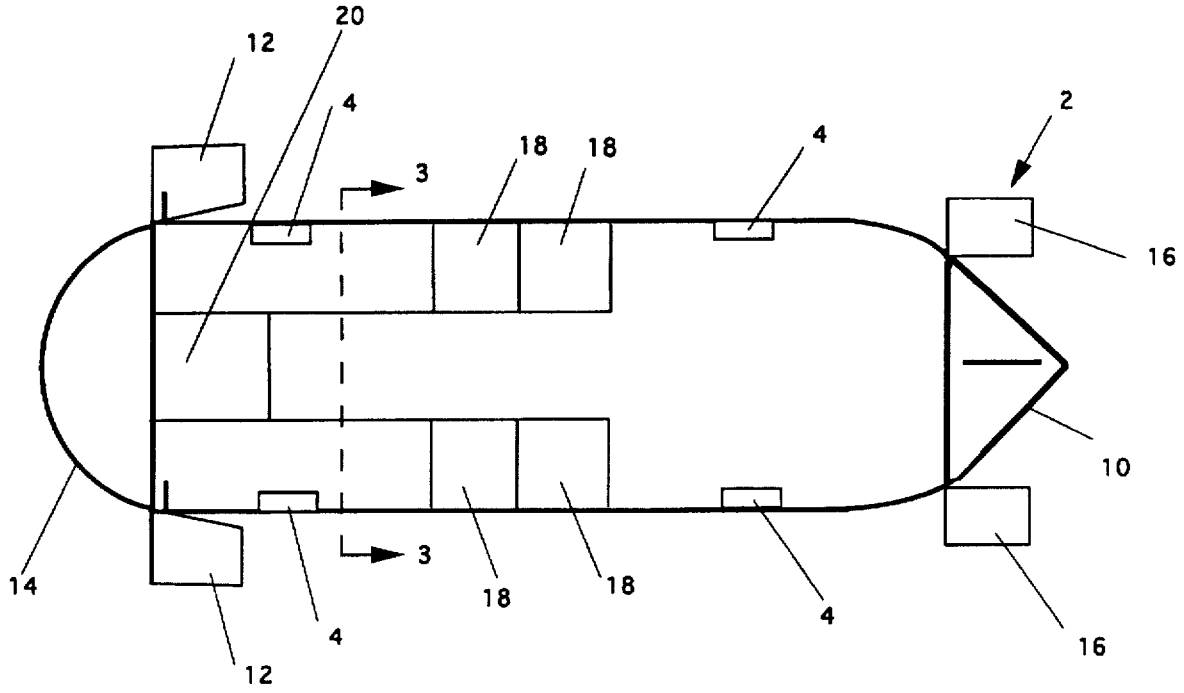
FIG. 2 is a view from above the submersible boat.

FIG. 2 illustrates the submersible boat 2 with a pointed end 10 and a blunt end 14. Passenger hatches 18 and a crew hatch 20 provide access to the interior of the submersible boat 2. Lifting eyes 4 allow for hoisting of the submersible boat 2. Bow planes 12 are located along the sides of the submersible boat 2 near the blunt end 14. Stern planes 16 are located along the sides of the submersible boat 2 near the pointed end 10. The stern planes 16 are hinge mounted to the hull and hard mounted to the thruster assembly arm (not shown). When rotated outboard, they provide submerged vertical stability and propulsion. When rotated inboard, they are secured for 4 surface operation.

When the submersible boat 2 is diving, the leading edge of the bow planes 12 is tipped down and the leading edge of the stem planes 16 is tipped up while the submersible boat 2 is propelled with the blunt end 14 forward. When the submersible boat 2 ascends, the leading edge of the bow planes 12 is tipped up and the leading edge of the stern planes 16 is tipped down while the submersible boat 2 is propelled with the blunt end 14 forward.

Figure 3:
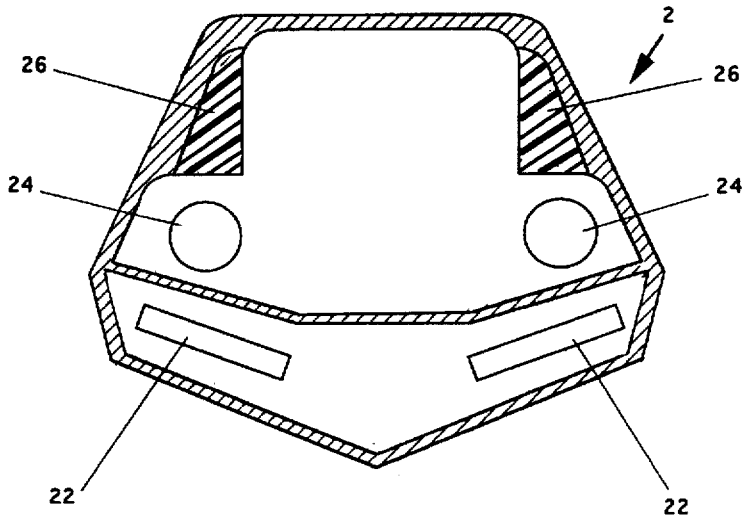
FIG. 3 is a cross sectional view taken on line 3—3 of FIG. 2.

FIG. 3 illustrates the location of the open ballast tanks 22, the closed ballast tanks 24, and the foam core 26 of the submersible boat 2.

Figure 4:
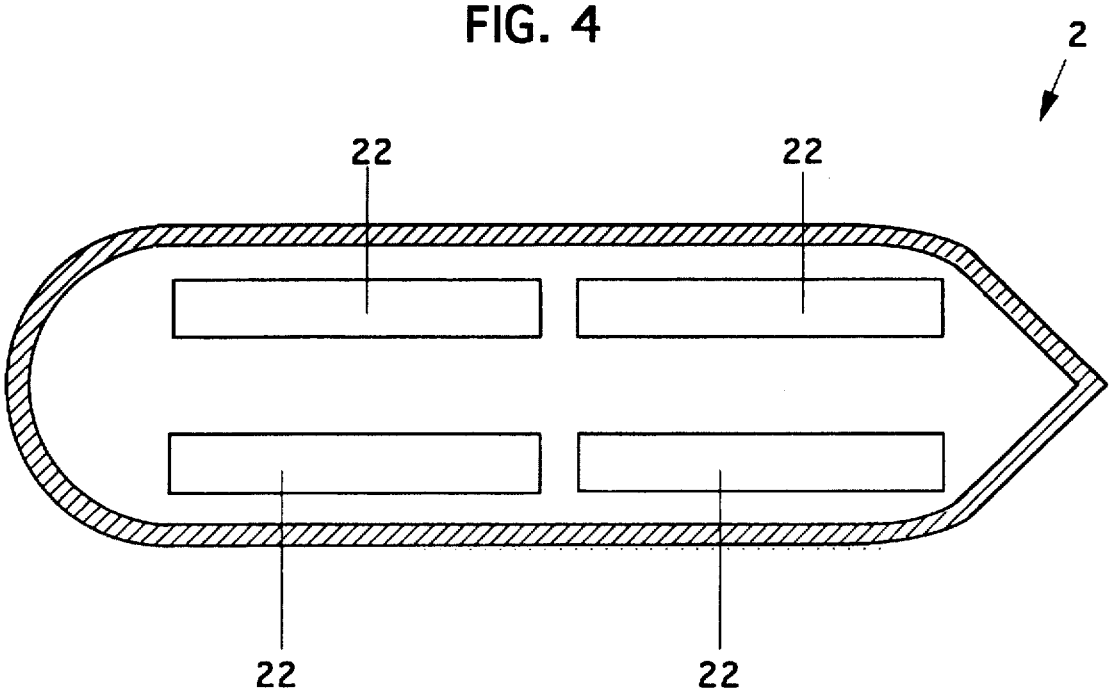
FIG. 4 is a cross sectional view taken on line 4—4 of FIG. 1.

FIG. 4 illustrates the location of the open ballast tanks 22. Four aluminum open ballast tanks 22, with an open bottom to the surrounding environment, are located beneath the deck of the submersible boat 2. Each of the open ballast tanks 22 is equipped with an air control valve which directs the flow of air in the open ballast tank 22 and an air operated vent valve for flooding the open ballast tank 22. The open ballast tanks 22 are dry when the submersible boat 2 functions as a planing boat. When the submersible boat 2 is submerged, the air is vented from the open ballast tanks 22 in order to allow water to flood into the open ballast tanks 22. When the submersible boat 2 ascends up to the water surface, the water in the open ballast tanks 22 is displaced with air.

Figure 5:
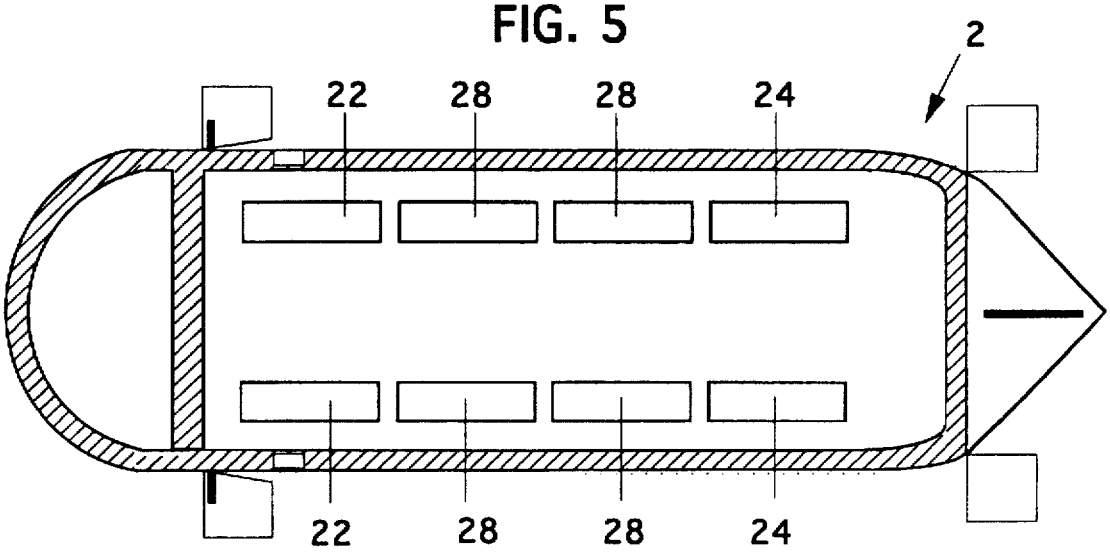
FIG. 5 is a cross sectional view taken on line 5—5 of FIG. 1.

FIG. 5 illustrates the location of the closed ballast tanks 24 and the air pressure tanks 28. The closed ballast system adjusts the water weight in the closed ballast tanks 24 of the submersible boat 2 to achieve neutral buoyancy and trim during submerged operations. Four closed ballast tanks 24, two forward and two aft, are welded onto the deck of the hull. Each closed ballast tank 24 has a capacity of approximately 250 pounds of seawater. These closed ballast tanks 24 are used to compensate for any change in weight of the submersible boat 2, which can be caused by fuel consumption or weight distribution. The water level in the closed ballast tanks 24 is controlled by a hydraulically driven ballast pump. The level of the water in each closed ballast tank 24 is displayed on an electronic ballast level indicator. Each closed ballast tank 24 is equipped with a water control valve which, when opened, allows water to be pumped in or out of the closed ballast tank 24. The system also has a drain valve which can be opened to allow the closed ballast tanks 24 to drain by gravity.

The submersible boat 2 has a pressurized air system consisting of four aluminum air pressure tanks 28, 2500 pounds per square inch each, that are mounted on the deck of the hull. The air pressure tank 28 are manifolded such that each air pressure tank 28 is discharged at the same rate as the air supply is consumed. Minimum operating pressure is 1000 pounds per square inch. The pressurized air system provides support to all the systems within the submersible boat 2 which require pressurized air.

Figure 6:
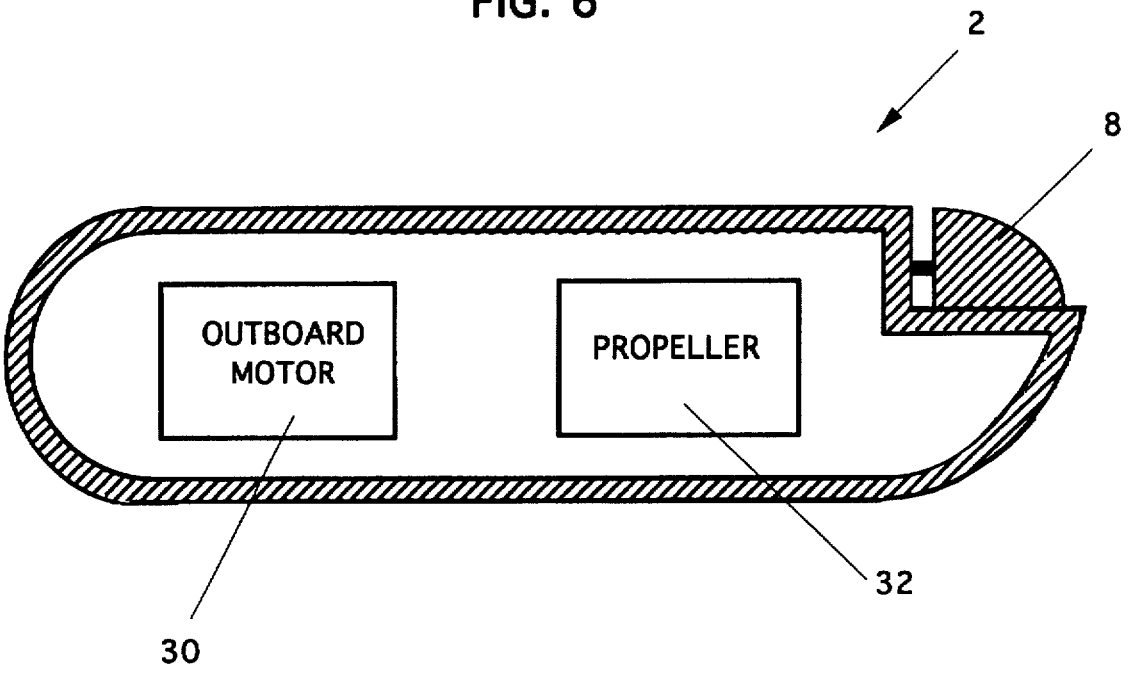
FIG. 6 is a schematic diagram illustrating the propulsion system of the submersible boat.

FIG. 6 is a schematic diagram illustrating the propulsion system of the submersible boat 2. Outboard motors 30 are used to propel and steer the submersible boat 2 as it moves near the surface of the water. As the submersible boat 2 submerges and moves below the surface of the water, propellers 32 are used for propulsion and the rudder 8 is used for steering.

This invention has been described in detail with particular reference to certain preferred embodiments thereof, but it should be understood that variations and modifications can be effected within the spirit and scope of the invention.

What is claimed is:

1. A vessel which can operate both as a planing boat and as a submarine comprising:

a blunt end of said vessel, an outboard motor located near said blunt end of said vessel, a pointed end of said vessel, a propeller located near said pointed end of said vessel, wherein said outboard motor propels said vessel with said pointed end forward as said vessel moves at planing speeds, wherein said propeller propels said vessel with said blunt end forward when said vessel operates as a submarine, a rudder located near said pointed end of said vessel, wherein said rudder steers said vessel when said propeller propels said vessel, a plurality of bow planes, a plurality of stern planes, wherein, the pressure of the water flowing over and under said bow planes and said stern planes steers said vessel as said vessel submerges and ascends, a plurality of open ballast tanks, and a plurality of closed ballast tanks, wherein, movement of water into and out of said open ballast tanks and said closed ballast tanks changes the weight of said vessel.

2. A vessel which can operate both as a planing boat and as a submarine comprising:

a blunt end of said vessel, a pointed end of said vessel, a propeller located near said pointed end of said vessel for propelling said vessel with said blunt end forward when said vessel operates as a submarine, an outboard motor located at said blunt end of said vessel for propelling said vessel with said pointed end forward when said vessel operates as a planing boat, a plurality of bow planes, a plurality of stern planes, wherein, the pressure of the water flowing over and under said bow planes and said stern planes steers said vessel in the desired direction, a plurality of open ballast tanks, a plurality of closed ballast tanks, wherein, movement of water into and out of said open ballast tanks and said closed ballast tanks changes the weight of said vessel, and a rudder located near said pointed end of said vessel, wherein, said rudder steers said vessel when said propeller propels said vessel.

3. The vessel of claim 2 further comprising a foam core top constructed of a glass fiber material.

4. The vessel of claim 3 further comprising a plurality of hatches in said foam core top, wherein, the passengers and the crew of said vessel can enter said vessel through said hatches.

*5. A vessel which can operate both as a planing boat and as a submarine, comprising:*

*opposed blunt and pointed ends of said vessel;*

*first propulsion means mounted to said vessel near said blunt end for propelling said vessel in a first forward direction of operation defined by said pointed end being forward when said vessel operates as a planing boat;*

*second propulsion means located near said pointed end for propelling said vessel in a second forward direction of operation defined by said blunt end being forward when said vessel operates as a submarine;*

*means mounted to said vessel for steering said vessel when said vessel moves with said blunt end forward or said pointed end forward; and*

*means mounted to said vessel for ballasting said vessel.*

*6. A vessel which can operate both as a planing boat and as a submarine, comprising:*

*opposed blunt and pointed ends of said vessel;*

*propulsion means mounted to said vessel for propelling said vessel in a first forward direction of operation defined by said pointed end being forward as said vessel operates as a planing boat and for propelling said vessel in a second forward direction of operation defined by said blunt end being forward when said vessel operates as a submarine;*

*means mounted to said vessel for steering said vessel when said vessel moves with said blunt end forward or said pointed end forward; and*

*means mounted to said vessel for ballasting said vessel.*

*7. A vessel which can operate both as a planing boat and as a submarine, comprising:*

*opposed blunt and pointed ends of said vessel;*

*propulsion means mounted to said vessel for propelling said vessel in a first forward direction of operation defined by said pointed end being forward as said vessel operates as a planing boat and for propelling said vessel in a second forward direction of operation defined by said blunt end being forward when said vessel operates as a submarine;*

*a rudder located near said pointed end of said vessel for steering said vessel when said vessel moves with said blunt end forward;*

*a plurality of vanes for steering said vessel as said vessel submerges and ascends; and*

*at least one ballast tank.*

*8. A vessel which can operate both as a planing boat and as a submarine, comprising:*

*a blunt end and an opposed second end of said vessel;*

*propulsion means mounted to said vessel for propelling said vessel in a first forward direction of operation defined by said second end being forward when said vessel operates as a planing boat and for propelling said vessel in a second forward direction of operation defined by said blunt end being forward when said vessel operates as a submarine;*

*means mounted to said vessel for steering said vessel when said vessel moves with said blunt end forward or said second end forward;*

*means mounted to said vessel for ballasting said vessel.*

*9. The vessel of claim 6 wherein said steering means comprises:*

*means for steering said vessel from port to starboard; and*

*means for steering said vessel in pitch.*

*10. The vessel of claim 6 wherein said means for steering from port to starboard is a rudder.*

*11. The vessel of claim 6 wherein said steering means further comprises means for steering said vessel during ascent and descent.*

*12. The vessel of claim 11 wherein said means for steering said vessel during ascent and descent is a plurality of planes.*

*13. The vessel of claim 6 wherein said means for adjustably ballasting said vessel is at least one ballast tank.*

* * * * *